United States Patent
Collard

(10) Patent No.: US 7,637,088 B2
(45) Date of Patent: Dec. 29, 2009

(54) PROFILED MODULAR CASING FOR CUTTING PLANTS, IN PARTICULAR FOR EQUIPPING VINE TRIMMERS

(75) Inventor: Michel Collard, 6, rue des Tartelettes, Bouzy (FR) 51150

(73) Assignee: Michel Collard, Bouzy (FR)

(*) Notice: Subject to any disclaimer, the term of this patent is extended or adjusted under 35 U.S.C. 154(b) by 283 days.

(21) Appl. No.: 11/418,125

(22) Filed: May 5, 2006

(65) Prior Publication Data

US 2006/0248867 A1    Nov. 9, 2006

(30) Foreign Application Priority Data

May 9, 2005    (FR) .................................. 05 04713

(51) Int. Cl.
*A01D 34/00* (2006.01)
(52) U.S. Cl. ...................................... 56/13.6; 56/320.1
(58) Field of Classification Search ........... 56/233–235, 56/255, 257, 17.5, 17.6, 320.17, 6, 157, 189, 56/249, 264
See application file for complete search history.

(56) References Cited

U.S. PATENT DOCUMENTS

| | | | | |
|---|---|---|---|---|
| 2,197,561 A | * | 4/1940 | Orr ............................ | 56/320.1 |
| 2,263,431 A | * | 11/1941 | White ......................... | 56/13.4 |
| 3,006,129 A | * | 10/1961 | Sayre .......................... | 56/292 |
| 3,366,352 A | * | 1/1968 | Edwards et al. ............. | 244/130 |
| 3,401,512 A | * | 9/1968 | Pool et al. .................... | 56/298 |
| 4,015,666 A | * | 4/1977 | Brouwer et al. .............. | 172/19 |
| 4,055,890 A | * | 11/1977 | Seibold ........................ | 30/240 |
| 4,157,004 A | * | 6/1979 | van der Lely ................ | 56/13.6 |
| 4,231,216 A | * | 11/1980 | Weber ......................... | 56/13.6 |
| 4,302,921 A | * | 12/1981 | Weber ......................... | 56/13.6 |
| 4,302,922 A | * | 12/1981 | Guerndt et al. ............... | 56/235 |
| 4,455,815 A | * | 6/1984 | Grant .......................... | 56/235 |
| 4,627,227 A | * | 12/1986 | Dixon .......................... | 56/235 |
| 5,012,635 A | * | 5/1991 | Walters et al. ............... | 56/13.6 |
| 5,117,619 A | * | 6/1992 | Fassauer ...................... | 56/128 |

(Continued)

FOREIGN PATENT DOCUMENTS

EP    0230156 A    7/1987

(Continued)

OTHER PUBLICATIONS

Search Report issued Jan. 2, 2006 in corresponding French Application No. 0504713 filed May 9, 2005.

*Primary Examiner*—Thomas B Will
*Assistant Examiner*—Joan D Misa
(74) *Attorney, Agent, or Firm*—Davidson Berquist Jackson & Gowdey LLP

(57) ABSTRACT

A cutting apparatus having a modular profiled casing for cutting plants and intended, in particular, for equipping vine trimmers. The modular profiled casing is made up of a number of cutting elements attached longitudinally to one another for the purpose of reciprocal drive by at least one motor with one of the cutting heads being integral in rotation with the other cutting heads through a system of double pulleys and belts. All the cutting elements are connected together and covered by the same profiled cover having a convex profile forming a leading edge and includes a vegetation detector forming a trailing edge that, respectively, facilitate the penetration and displacement of the casing in the vegetation and the removal of cut branches.

2 Claims, 5 Drawing Sheets

U.S. PATENT DOCUMENTS 5,362,157 A * 11/1994 Ichida ........................ 384/45
5,775,075 A * 7/1998 Dannar ...................... 56/15.2
6,311,746 B1 * 11/2001 Halvorson et al. ....... 144/24.13
6,712,316 B2 * 3/2004 Jones ........................ 244/132
7,207,143 B2 * 4/2007 Stanchfield ................. 52/459
2005/0188666 A1 * 9/2005 Jackson et al. ................ 56/246

FOREIGN PATENT DOCUMENTS

| FR | 2787966 A | 7/2000 |
| FR | 2832024 A | 5/2003 |
| FR | 2893222 A1 * | 5/2007 |

* cited by examiner

PROFILED MODULAR CASING FOR CUTTING PLANTS, IN PARTICULAR FOR EQUIPPING VINE TRIMMERS

CROSS-REFERENCE TO RELATED APPLICATIONS

The present application claims priority to French Application No. 0504713 filed May 9, 2005, the entire contents of which are herein incorporated by reference.

BACKGROUND OF THE INVENTION

1. Field of the Invention

The invention relates to a profiled modular casing for cutting plants, in particular for equipping vine trimmers.

2. Description of Related Art

In viticulture it is known to make use of trimmers utilizing modular casings constituted primarily by cutting elements fixed to one another and being driven reciprocally, each cutting element being constituted by a profiled body on which is fixed a shaft, fitted at one of its ends with a cutting blade and, at the other end, by a double pulley enabling step-by-step drive of all the cutting heads of the same casing from a single hydraulic motor equipping one of the cutting elements. These modular casings are made from light-alloy profiled bodies, of appropriate cross-section, produced in long lengths, which are then cut to a length corresponding to the desired level of modularity; the cutting elements are assembled by means of components of trapezoid cross-section, fastened by screws in grooves of corresponding cross-section. Such a device is described in European patent No. 0.230.156.

French patent No. 2.787.966 also discloses a modular branch lopper, intended for equipping a device for lopping trees and bushes for the purpose of lending the latter a sculpted shape. This branch lopper essentially comprises a base module, made up of a profiled body, whereof the bottom is provided with orifices and openings allowing tools to be passed through, and a profiled cover provided with an opening for the drive shaft of the corresponding tool holder and orifices for fixing the latter to said cover, and additional modules, of the same design and of the same cross-section as the base module, integral and kept in alignment with the latter by linking members screwed in on either side of the parting plane of the modules which they straddle: the covers of the modules fit together in the edges of the latter by means of lateral ribs. As in the case analyzed in brief hereinabove, the profiled bodies and their covers are obtained by cutting up metal profiles of corresponding cross-section and dimensions, previously manufactured in long lengths.

In both cases, but more particularly in the first case relating to the lateral trimming and simultaneous pollarding of entire rows of vines, problems arise for trimmers with penetrating vegetation, as well as prompt removal of cut branches and protection of the transmission from shocks, especially considering projecting parts, notch formations, and the very shape of the casings as well as the nature of the material used for their manufacture in view of making them lighter (light alloy).

SUMMARY OF THE INVENTION

The aim of the present invention is to rectify these drawbacks. This invention, such as is characterized, solves the problem by providing a profiled modular casing for plant trimmers, with which, on the one hand, penetration of the trimmers into vegetation is made easier, as well as removal of cut branches, and, on the other hand, excellent rigidity of the transmission is obtained and maintained in spite of shocks.

The profiled modular casing for cutting plants according to the present invention, constituted by several cutting elements attached longitudinally to one another for the purpose of reciprocal drive, with each cutting member being constituted mainly by a profiled U-shaped body on which and through which is fixed, by means of a mobile bearing, a shaft fitted at one of its ends by at least one cutting head and, at the other end with a double pulley enabling step-by-step drive of all cutting heads from at least one motor attached to the end of the wings of the profiled U-shaped body of one of the cutting elements, whereby each profiled U-shaped body is closed by a profiled cover, also attached to the end of its wings and integral with the adjacent profiled body by linking members, trapezoid in cross-section, fastened by screws in grooves of similar cross-section arranged in the inner face of its wings, characterized in that all the cutting elements of the same profiled modular casing are connected by a profiled cover, by a vegetation deflector forming a trailing edge and by a convex profile forming a leading edge, located respectively on the downstream side and on the upstream side of the profiled U-shaped bodies, in that the drive motor is attached to the wings of a profiled U-shaped body by means of a plate substituting locally for the profiled cover, which is applied to the wings of said profiled body, before it is attached to the latter by a countersunk end screw.

According to a particular embodiment of the invention, the convex profile forming the leading edge is obtained by fixing a profile in a groove of suitable cross-section, arranged in the upstream side of the profiled U-shaped bodies; this profile is then recessed to accommodate and cover the screw heads for fastening together the profiled U-shaped bodies, so as to provide a leading edge free of any roughness. The profiled cover is applied to the wings of the profiled bodies and is attached to the latter by means preventing the vegetation from hooking on.

The vegetation deflector forming a trailing edge is fixed to the downstream side of the profiled U-shaped bodies by means of bolts whereof the head is engaged in a dovetailed groove, for this purpose set into said downstream side, and at least two brackets fixed to the profiled U-shaped end bodies of the assembly.

The advantages resulting from this invention consist mainly of the fact that the profiled modular casing in question has sufficient rigidity to protect the transmission of shocks inherent from work, an aerodynamic form making it easier to penetrate into vegetation, a smooth outer finish allowing direct removal of cut branches and optimal compactness, ensuring utilization under the best conditions with respect to safety, efficiency and yield, as well as increased resistance of the leading edge to shocks encountered during work, especially on stakes.

BRIEF DESCRIPTION OF THE DRAWINGS

Other characteristics and advantages will emerge from the following description of a profiled casing modular having two elements for vine trimmers, embodied according to the present invention, given by way of a non-limiting example, with respect to the attached diagrams, in which.

DETAILED DESCRIPTION OF THE PREFERRED EMBODIMENTS

Figure 1:
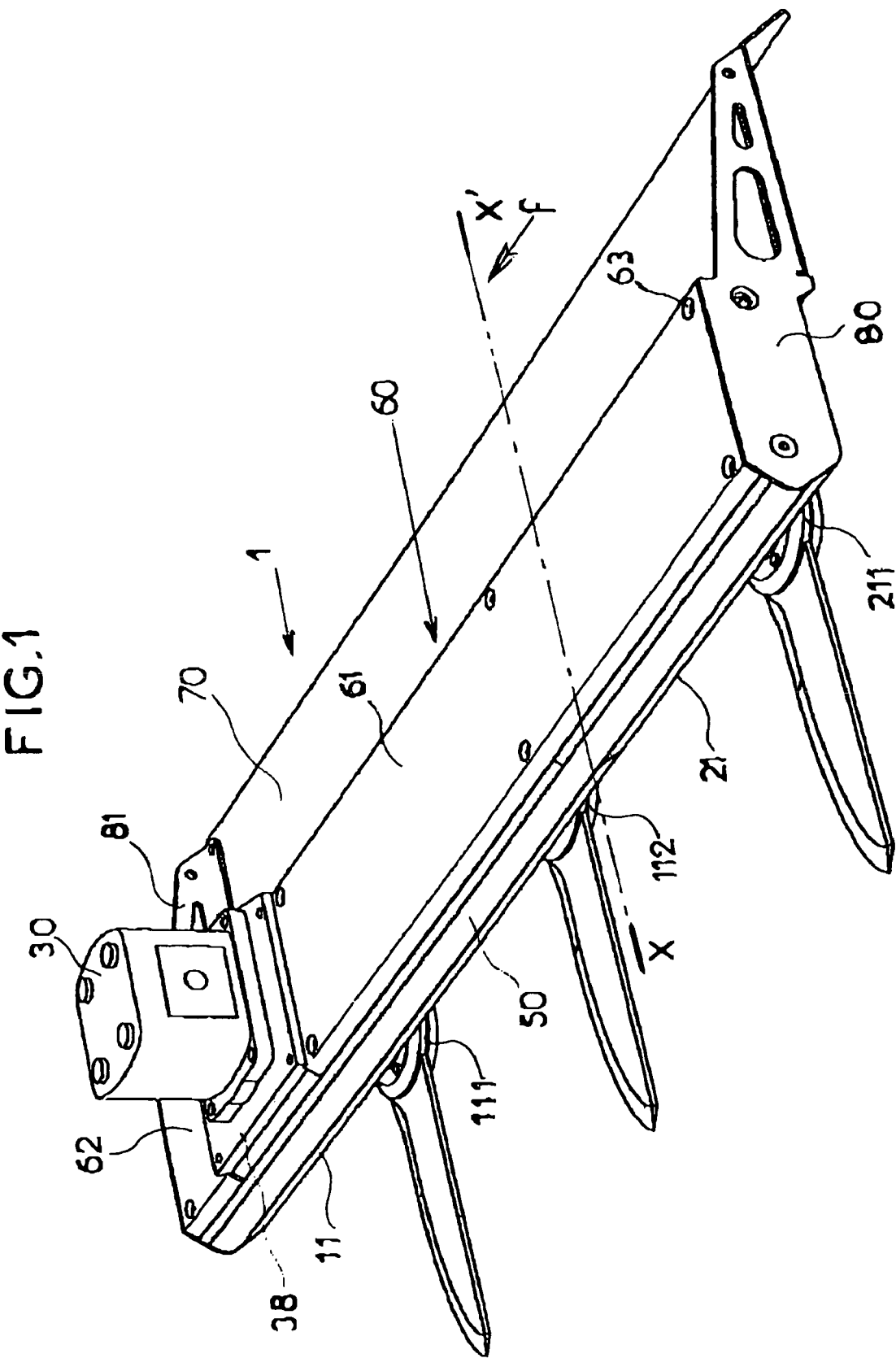
FIG. 1 illustrates a plan view, in perspective, of the profiled modular casing with two elements, on the drive motor side.

These figures illustrate a profiled modular casing 1 for trimming vines, comprising two cutting elements 10 and 20 respectively comprising a profiled U-shaped body 11 and 21, one of which 11, longer than the other, is fitted with cutting heads 111 and 112, one of which 111 is driven by a hydraulic motor 30 by way of a shaft 31 provided with a double pulley 32, and the other of which 112 is driven by way of a shaft 33 provided with a double pulley 34 connected to said pulley 32 equipping the shaft 31 by a linking belt 35; in this embodiment the other profiled body 21 is fitted with a single cutting head 211, driven by a shaft 33 provided with a double pulley 36 attached to the double pulley 34 of cutting element 10 by a linking belt 37.

The two cutting elements 10, 20 are attached to one another by cotters 40, attached to the profiled bodies 11 and 21 by screws 41, and by the elements 61 and 62 of a profiled cover 60, fastened by countersunk screws 63 on either side of the plate 38 for attaching the hydraulic motor 30 at the end of the wings of the profiled body 11 of cutting element 10, and fitted respectively on either side with a convex profile 50 having a groove 51 for accommodating the head of the screws 41 for fastening the linking cotters 40 of the profiled bodies 11 and 21; said profile 50 is attached by snap-locking in the grooves 113 and 213, of suitable cross-section, made in the upstream side 114, 214 of the profiled bodies 11 and 21 and the downstream side 115 and 215 of a vegetation deflector 70 attached to the profiled bodies 11 and 21 by means of bolts 71, whereof the head is introduced into dovetailed grooves 116 and 216, arranged in the downstream sides 115 and 215 of the profiled bodies 11 and 21, and brackets 80 and 81 attached by screws against the free ends 117 and 217 of the profiled bodies 11 and 21.

Figure 2:
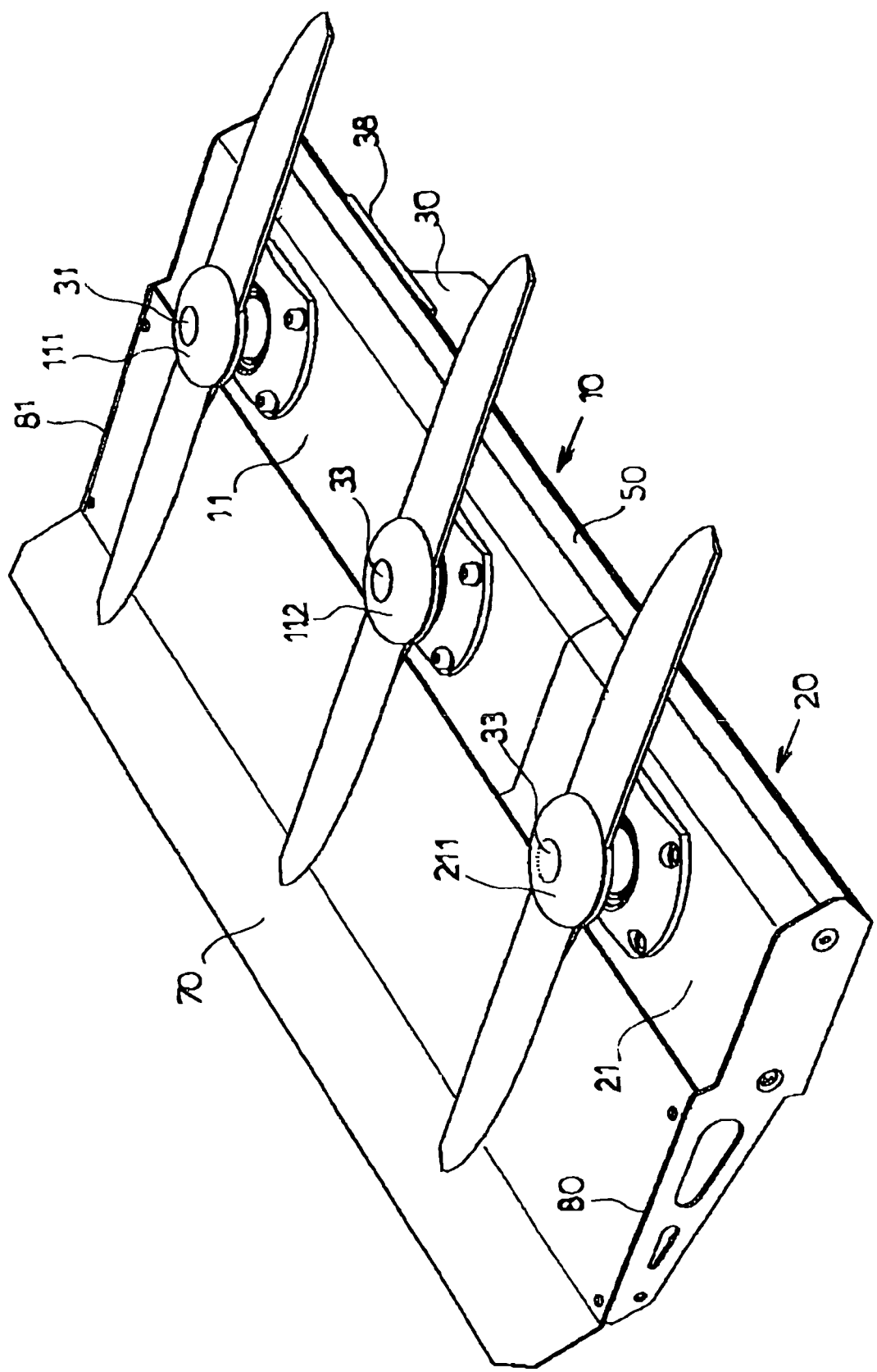
FIG. 2 illustrates a bottom view, in perspective, of the profiled modular casing according to FIG. 1, on the cutting head side.
Figure 3:
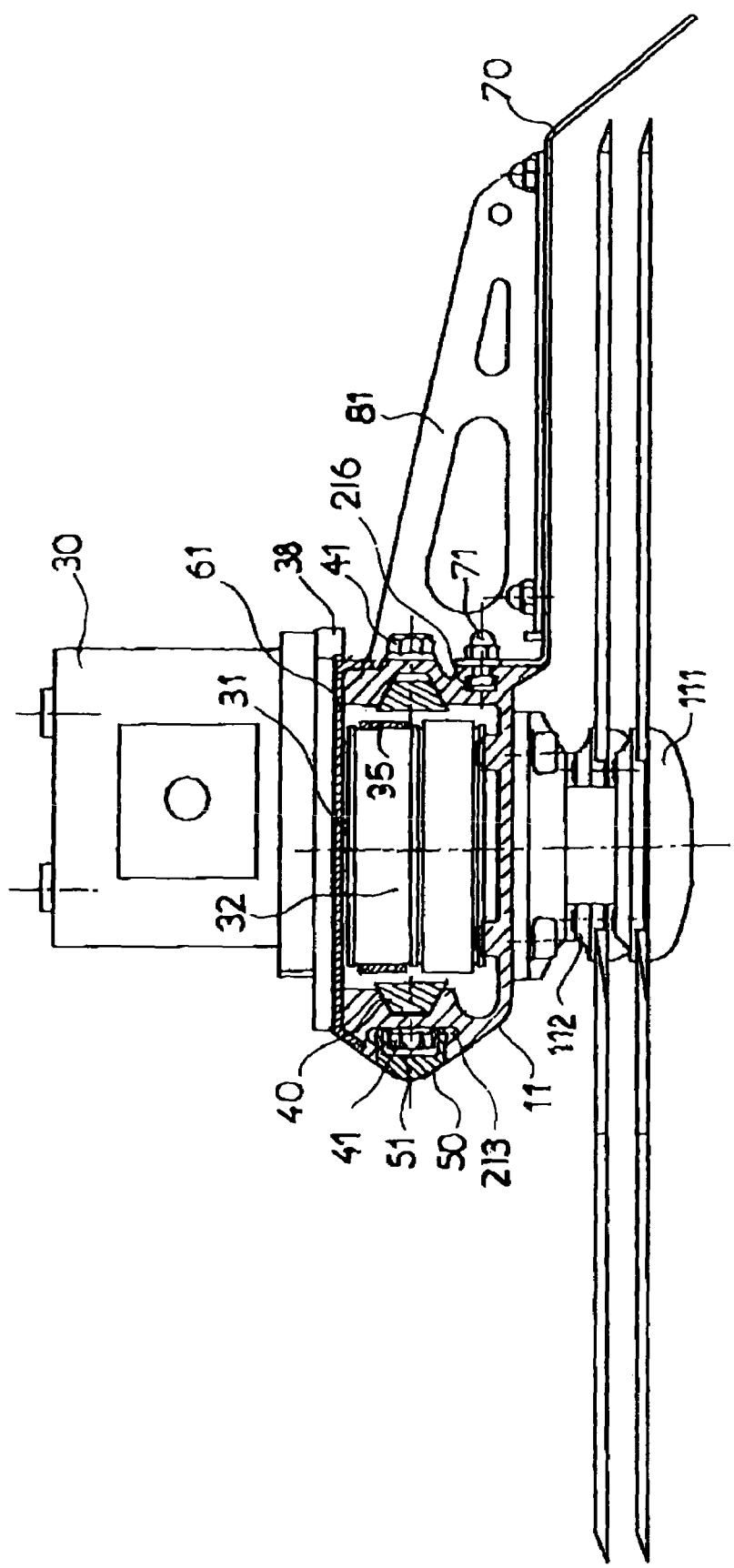
FIG. 3 illustrates a section according to the plane XX', a view according to f of the profiled modular casing as in FIG. 1.

On examining FIGS. 1 to 3 in greater detail it is evident that the profiled modular casing 1 embodied in this way has an aerodynamic profile, facilitating its penetration into vegetation, especially due to the cross-section given to the profiled bodies 11 and 21, and quite particularly to the presence of the convex profile 50 made of plastic and forming a leading edge, embedded in the upstream side of said profiled bodies 11 and 21, which also masks the screw heads 41 for attaching the cotters 40 for linking the two cutting elements 10 and 20, thus eliminating the risk that vegetation might become hooked up, at the same time making it easier for it to slide against the profiled bodies 11 and 21 and against the profiled cover 60 closing the hollow part of said bodies 11 and 21, whereof the edges have been designed to nest together at the outer end of the wings of the U-shaped profiles 11 and 21, with total engagement of the upstream edge of said profiled cover 60 in a milled section of suitable depth, machined over the entire length of the profiled bodies 11 and 21, thus also making it easier there for the vegetation to slide, without the danger of branches being caught up between the profiled cover 60 and the edges of the profiled bodies 11 and 21. It is also evident that this profiled cover 60, in light of its cross-section and the length of its main member 61, contributes to joining the two cutting elements 10 and 20 and to reinforcing the rigidity of the profiled modular casing 1.

It is also noticed in the same figures that considering its position and shape the vegetation deflector 70 also contributes substantially to the progress of the vegetation and to its being kept in the cutting plane during trimming.

Figure 4:
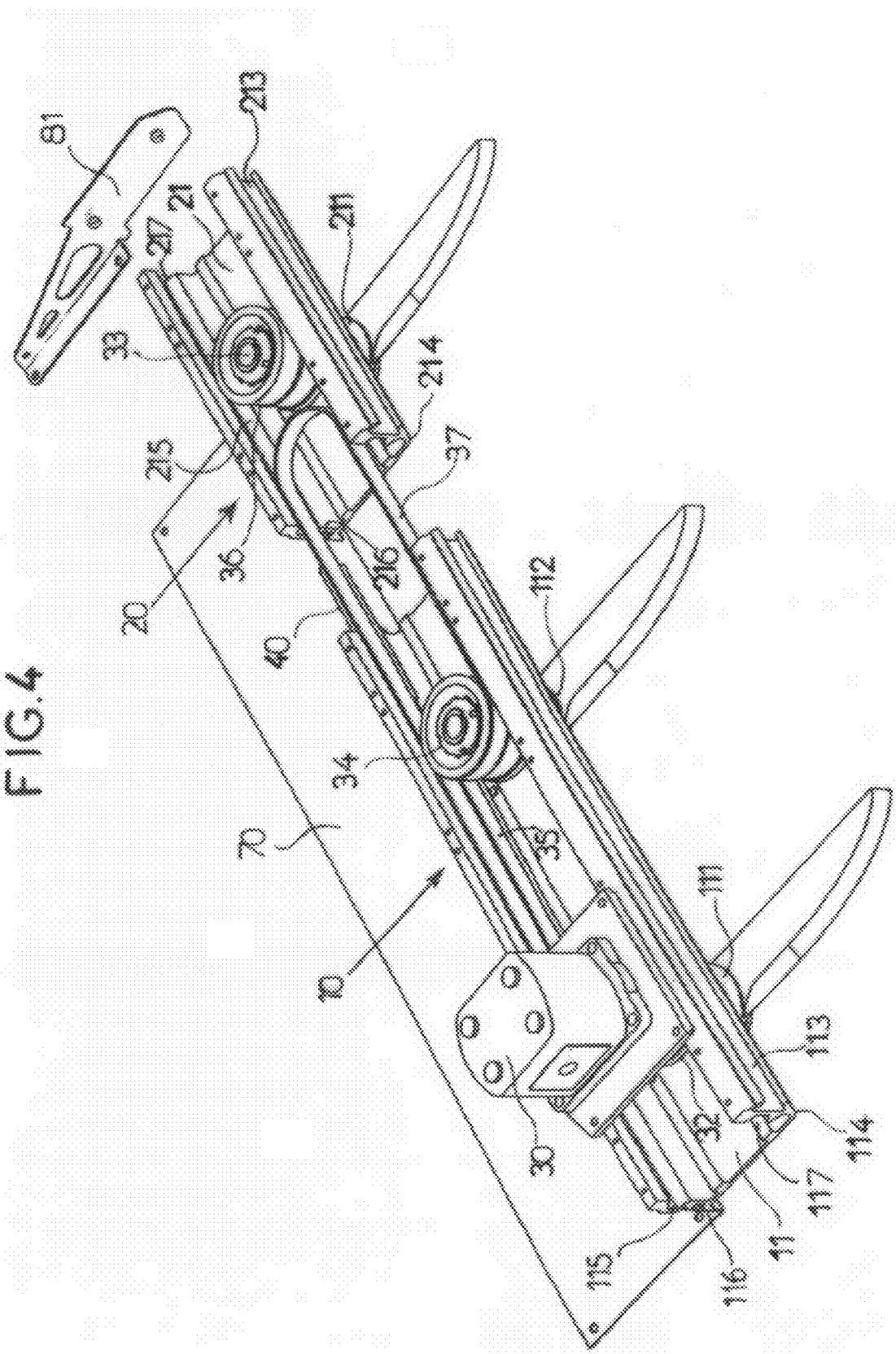
FIG. 4 illustrates a plan view, in perspective, partially exploded, of the profiled modular casing according to FIG. 1, with cover and leading edge removed.
Figure 5:
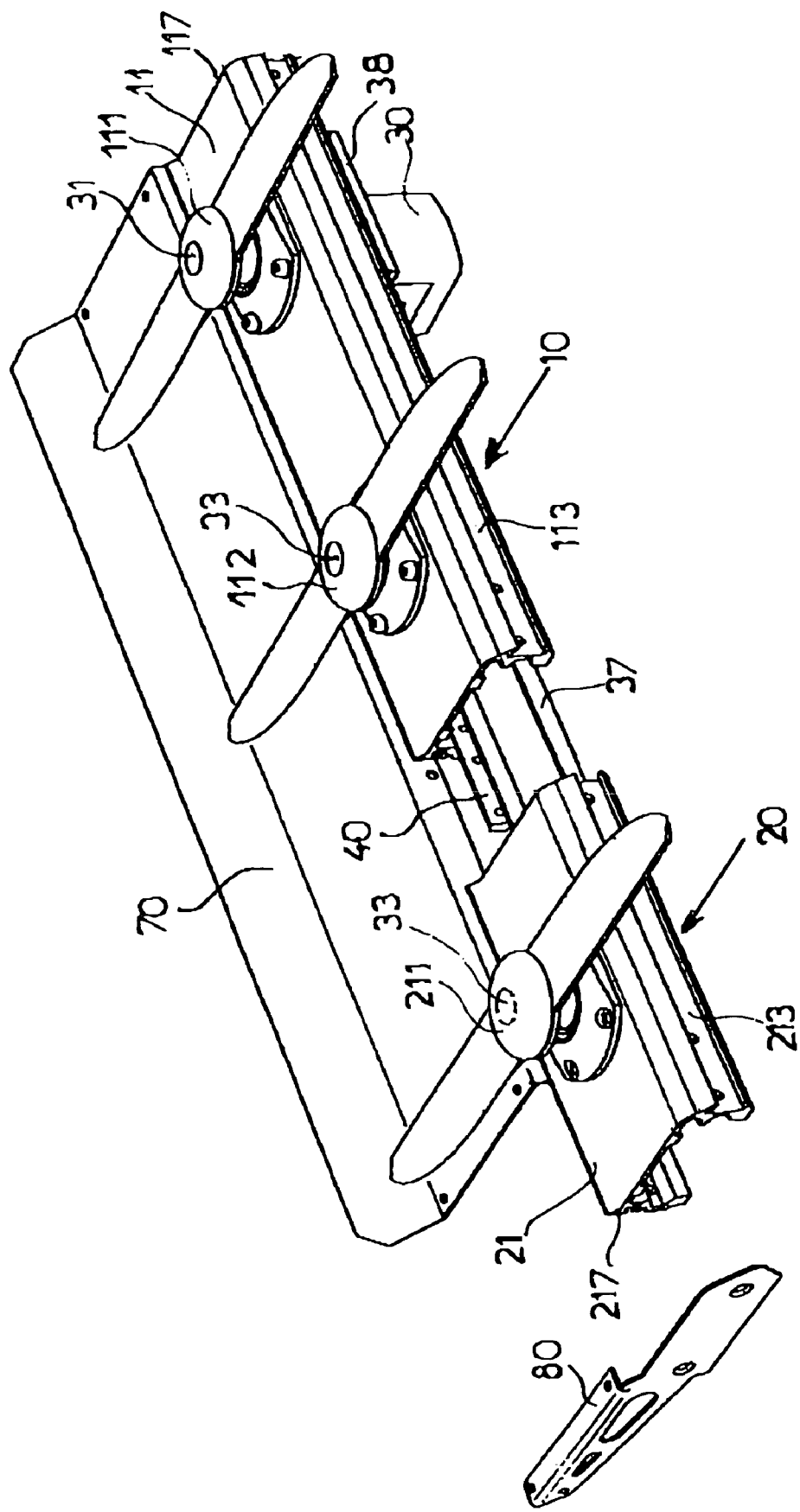
FIG. 5 illustrates a bottom view, in perspective, partially exploded, of the profiled modular casing according to FIG. 2, with cover and leading edge removed.

With reference now to FIGS. 4 and 5, it is noted for reasons of simplification and rigidity that the base module comprising the cutting element 10 comprises two cuttings heads 111 and 112, one of which 111 is connected to the hydraulic drive motor 30 of the assembly of modules constituting a profiled modular casing, and it is the addition of one or more other modules which embodies for example a profiled modular casing of the same design, but comprising one or more cutting heads, whereby the latter are driven step by step by means of belts 37 and double pulleys 36, with which the drive shaft 33 of the cutting head 211 is equipped.

The invention claimed is:

1. A profiled modular casing for cutting plants comprising a plurality of cutting elements attached longitudinally to one another for the purpose of reciprocal drive, each cutting element comprising a U-shaped body on which and through which is fixed, by means of a mobile bearing, a shaft fitted at one of its ends by at least one cutting head and, at the other end with a double pulley enabling step-by-step drive of all cutting heads from at least one motor attached to an end of the U-shaped body of one of the cutting elements, each U-shaped body being attached to and integral with the adjacent U-shaped body by linking members fastened by screws in grooves of similar cross-section arranged in an inner face thereof, wherein each of the plurality of cutting elements within the same profiled modular casing are connected and covered by a contoured cover, by a vegetation deflector having a main portion and a rear portion arranged at an angle to the main portion and forming a trailing edge thereof on a downstream side and by a curved contoured section forming a leading edge along the profiled modular casing that blends on an upstream side with a front portion of the contoured cover and a shaped lower portion of the profiled modular casing and which covers the linking member screws.

2. The profiled modular casing as claimed in claim 1, wherein the vegetation deflector forming a trailing edge is fixed to the downstream side of the U-shaped bodies by means of bolts with their heads engaged and fixed in a dovetailed groove, arranged in said downstream side, and by at least two brackets fixed to the end of the U-shaped bodies of the assembly, each bracket having a first portion covering the end of the U-shaped bodies and a second portion attached to and supporting the deflector.

* * * * *